United States Patent Office 3,686,162
Patented Aug. 22, 1972

3,686,162
MONOAZO DYESTUFFS CONTAINING A BENZTHIAZOLYL RADICAL
Klaus Artz, Muttenz, Switzerland, assignor to
Ciba-Geigy AG
Muttenz, Switzerland
No Drawing. Filed Jan. 22, 1970, Ser. No. 5,159
Claims priority, application Switzerland, Jan. 24, 1969,
1,105/69
Int. Cl. C09b 29/08
U.S. Cl. 260—158                9 Claims

ABSTRACT OF THE DISCLOSURE

The invention relates to an azo dyestuff that is free from acidic groups imparting solubility in water and has the formula

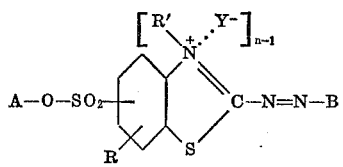

in which A represents an aryl residue, R represents a hydrogen atom or an organic residue, $n=1$ or 2, R' represents an alkyl or aralkyl group, $Y^-$ represents an anion and B represents the residue of a coupling component.

---

This invention provides new and valuable azo dyestuffs that are free from acidic groups imparting solubility in water and have the formula (1)
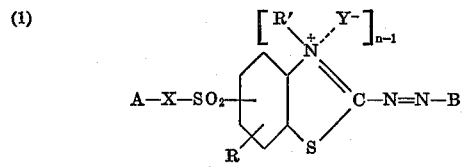

in which A represents an aryl residue, R represents a hydrogen atom or an organic residue free from groups imparting solubility in water, especially a methyl group, $n=1$ or 2, $Y^-$ represents the residue of an anion, R' represents an alkyl or aralkyl group, X represents a sulphur or an oxygen atom and B represents the residue of a coupling component.

A preferred embodiment of the invention are dyestuffs of the Formula 1 in which A represents a phenyl residue that may be substituted and that preferably have the formula

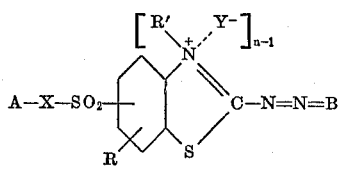

The group A may be an aryl residue of the naphthalene or preferably the benzene series that may carry substituents. The preferred substituents are principally those of the first order, by which is means substituents that direct a new substituent entering the benzene nucleus into para- or ortho-position in electrophilic substitution. The bond joining such substituents to the aromatic nucleus has a dipole moment which is greater than a Debye unit, the positive end of the dipole being attached to the aromatic ring. Substituents of the kind specified generally have sigma values that are not greater than 0.25 (cf. Jaffe, Chem. Reviews, vol. 53, pages 219–233 [1953]). The individual substituents are as follows: alkyl, alkoxy, cycloalkyl, phenyl, ureido and acyl groups, "acyl" being the term used to cover organic residues obtained by removing an OH group from an organic acid, for example a carboxylic acid, sulphonic acid, carbonic acid semi-ester or carbamic acid.

The following are examples of groups that are aryl residue A can carry: methyl, isopropyl, tert.-butyl, isooctyl, ethoxy, butoxy, cyclopentyl, cyclohexyl, phenyl, dimethylaminomethyl, diethylamino, phenoxy, acetylamino, butyrylamino, benzoylamino, butoxycarbonylamino, ethyloxycarbonylamino and butylaminocarbonylamino residues. Phenylazo residues may also be mentioned.

The preferred dyestuffs are those of the formula

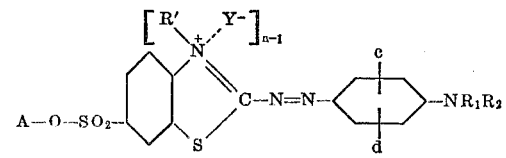

in which $R_1$, Y, $n$, A and X have the meanings given above, c represents a hydrogen or a halogen atom, a low-molecular alkyl, alkoxy or mercapto group, an aryl, arylmercapto or aryloxy group or a cycloalkyl, cycloalkylmethyl or benzyl residue, d represents the same or an acylamino residue and $R_1$ and $R_2$ each represents a hydrogen atom or an alkyl residue that may be substituted, and especially the dyestuffs of the formula

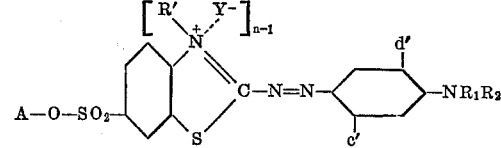

in which A, R', Y, $n$, $R_1$ and $R_2$ have the meanings given above and each of the residues c' and d' represents a hydrogen atom or a methyl, ethyl, methoxy, ethoxy, phenylthio or phenoxy residue.

In addition to the groups specified above, the group c' can also represent a chlorine or a bromine atom, a trifluoromethyl group or an acylamino group that may be alkylated, preferably methylated, at the nitrogen atom, in which group the acyl residue is the residue of an organic monocarboxylic acid, an organic monosulphonic acid, for example methane-, ethane or para-toluenemonosulphonic acid, or the residue of a carbamic acid- or a carbonic acid-monoester, for example phenoxycarbonyl, methoxycarbonyl and aminocarbonyl.

The groups $R_1$ and $R_2$ may be lower alkyl groups, that is to say, alkyl groups having 1 to 3 carbon atoms and that contain at least one negative substituent, that is to say, substituted methyl, ethyl, n-propyl or iso-propyl groups, for example benzyl or β-phenylethyl groups, halogenated alkyl groups, for example β-chloroethyl, β,β,β-trifluoroethyl and β,γ-dichloropropyl groups, as well as β-cyanoethyl and β-cyanoethoxyethyl groups, alkoxyalkyl groups, for example β-ethoxyethyl or δ-methoxybutyl, β- or γ-carbo-(methoxy- or ethoxy)-propyl groups; acylaminoalkyl groups, for example, β-(acetyl- or formyl)-aminoethyl groups; fatty acid acyloxyalkyl groups, for example β-formyloxyethyl, β-acetyloxyethyl, β,γ-diacetoxypropyl, γ-butyryloxypropyl groups; β-arylsulphonylalkyl groups, for example β-phenylsulphonylethyl, β-(para-toluenesulphonyl)-ethyl groups; alkyl or arylcarbamoyloxyalkyl groups, for example β-methylcarbamyloxyethyl and β-phenylcarbamyloxyethyl groups; alkyloxycarbonylalkyl groups, for example β-(methoxy- ethoxy- or isopropyloxy)-carbonyloxyethyl, γ-acetamidopropyl, β-(para-nitrophenoxy)-ethyl, β-(para-hydroxyphenoxy)-ethyl, β-(β'-acetylethoxycarbonyl)-ethyl, β-[(β'-cyano-, hydroxy-, methoxy- or acetoxy-)-ethoxycarbonyl]-ethyl, β-carboxylethyl, β-acetylethyl, β-diethylaminoethyl, β-cyanoacetoxyethyl, β-benzoyl and β-(para-alkoxy- or phenoxybenzoyl)-oxyethyl groups. The groups $R_1$ and $R_2$ generally contain not more than 18 carbon atoms.

The new dyestuffs may be obtained by diazotizing a benzthiazolyl-2-amine of the formula

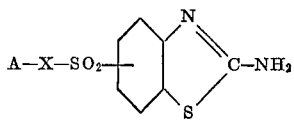

in which A represents an aryl residue that may be substituted and X represents a sulphur atom or preferably an oxygen atom, coupling with a coupling component H–B and, if necessary, quaternating the dyestuff obtained with an alkylating agent.

The aryloxysulphonylbenzthiazolyl-2-amines used as starting materials, and particularly the 6-aryloxysulphonyl derivatives, may be obtained by reacting a thio- or preferably a hydroxy-aryl compound with para-nitrobenzenesulphochloride, reducing the para-nitrobenzenesulphonate to an amine, thiocyanating the para-aminobenzenesulphonic acid ester in orthoposition to the amino group and then condensing to form the benzthiazolyl-2-amine.

An alternative method is to convert 2-mercaptobenzthiazoles into 2-alkylthioethers, sulphochlorinate the benzene nucleus, react the sulphochlorides with phenols and then aminate the aryloxysulphonylbenzthiazolyl-2-alkylthioethers in 2-position with liquid ammonia.

The following compounds are examples of suitable diazo components having a benzthiazolyl residue:

2-amino-6-phenyloxysulphonylbenzthiazole,
2-amino-6-(4'-carbethoxyphenyloxysulphonyl)-benzthiazole,
2-amino-6-(3'-methylphenyloxysulphonyl)-benzthiazole,
2-amino-6-(3'-methoxyphenyloxysulphonyl)-benzthiazole,
2-amino-6-(2'-chlorophenyloxysulphonyl)-benzthiazole,
2-amino-6-(3'-trifluoromethylphenyloxysulphonyl)-benzthiazole,
2-amino-6-(4'-methyl-2-nitrophenyloxysulphonyl)-benzthiazole,
2-amino-6-(4'-cyanophenyloxysulphonyl)-benzthiazole,
2-amino-6-(4'-acetaminophenyloxysulphonyl)-benzthiazole,
2-amino-6-(3'-dimethylaminophenyloxysulphonyl)-benzthiazole,
2-amino-6-(4'-acetylphenyloxysulphonyl)-benzthiazole,
2-amino-6-(4'-cyanoethylphenyloxysulphonyl)-benzthiazole,
2-amino-6-(β-naphthyloxysulphonyl)-benzthiazole,
2-amino-6-(4'-nitrophenylmercaptosulphonyl)-benzthiazole, and
2-amino-6-(4'-phenylphenyloxysulphonyl)-benzthiazole.

Any desired coupling component can be used in the manufacture of the azo dyestuffs, for example, coupling components of the benzene or naphthalene series or those of the heterocyclic series. Coupling components of the benzene series that may be mentioned in addition to the phenols, for example meta- or para-cresol, resorcinol and 1-hydroxy-3-cyanomethylbenzene, are in particular, the aminobenzenes, for example, aniline,
3-methylaniline,
2-methoxy-5-methylaniline,
3-acetylamino-1-aminobenzene,
N-methylaniline,
N,β-hydroxyethylaniline,
N,β-methoxyethylaniline,
N,β-cyanoethylaniline,
N,β-chloroethylaniline,
dimethylaniline,
diethylaniline,
N-methyl-N-(benzyl- or β-phenylethyl)-aniline,
N-n-butyl-N-β-chloroethylaniline,
N-(methyl-, ethyl-, propyl- or butyl-)-N-β-cyanoethylaniline,
N-methyl-N-β-hydroxyethylaniline,
N-ethyl-N-β-chloroethylaniline,
N-methyl-N-β-acetoxyethylaniline,
N-ethyl-N-β-methoxyethylaniline,
N-β-cyanoethyl-N-β-chloroethylaniline,
N-cyanoethyl-N-(acetoxy- or benzoyloxyethyl)-aniline,
N,N-di-α-hydroxyethylaniline,
N,N-di-β-acetoxyethylaniline,
N-ethyl-N,2-hydroxy-3-chloropropylaniline,
N,N-di-β-cyanoethylaniline,
N,N-di-β-cyanoethyl-3-methylaniline,
N-β'-cyanoethyl-N-β''-hydroxyethyl-3-chloroaniline,
N,N-di-β-cyanoethyl-3-methoxyaniline,
N,N-dimethyl-3-acetylaminoaniline,
N-ethyl-N-β-cyanoethyl-3-acetylaminoaniline,
N,N-di-β-cyanoethyl-2-methoxy-5-acetylaminoaniline,
N-methyl-N-phenacylanilines,
N-β-cyanoethyl-2-chloroaniline,
N,N-diethyl-3-trifluoromethylaniline,
N-ethyl-N-phenylaniline,
diphenylamine,
N-methyldiphenylamine,
N-methyl-4-ethoxydiphenylamine or N-phenylmorpholine, and also in the amines of the formula

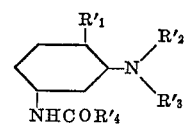

in which $R'_1$ represents a hydrogen atom or an alkyl or alkoxy group, $R'_2$ represents a cyanoalkoxyalkyl group, $R'_3$ represents a hydrogen atom or a cyanoalkoxyalkyl group or an acyloxyalkyl group and $R'_4$ represents a hydrogen atom, an alkyl, cycloalkyl or alkoxy group that may be substituted or a benzene residue, and in particular, those of the formula

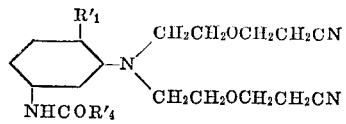

in which $R'_1$ and $R'_4$ have the meanings given above.

Valuable results can also be obtained with coupling components of the formulae

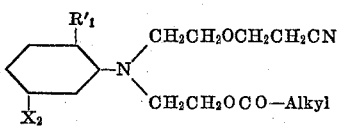

and

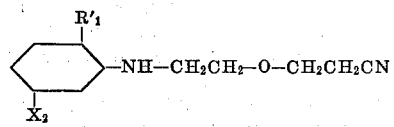

in which $R_1'$ has the meaning given above and $X_2$ represents an acylamino group, and in which "alkyl" represents, for example, a methyl, ethyl or propyl group.

The following coupling components are given as examples:

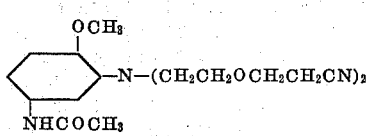

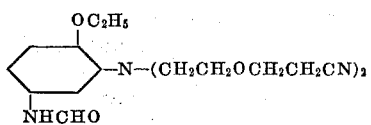

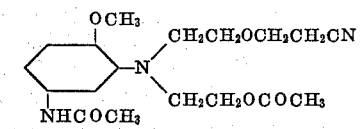

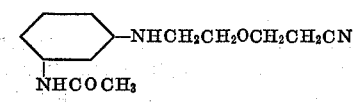

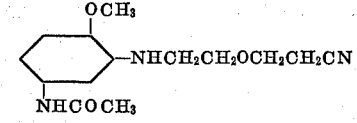

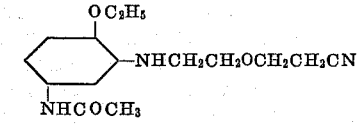

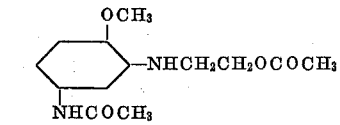

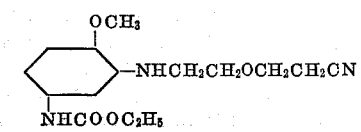

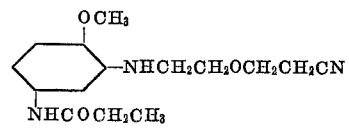

Coupling components of the naphthalene series, especially naphthols and aminonaphthalenes, are as follows:
α-naphthol,
β-naphthol,
4-methoxy-1-hydroxynaphthalene,
2-hydroxy-8-methylsulphonylaminonaphthalene,
2-hydroxynaphthalene-3-carboxylic acid anilide,
2-hydroxy-8-acetylaminonaphthalene,
1-hydroxynaphthalene-3-sulphonemethyleneether-4,
2-hydroxynaphthalene-6-sulphonamide,
2-hydroxynaphthalene-6-sulphonic acid dimethylamide,
1-hydroxy-5,8-dichloronaphthalene,
N,β-dimethylaminoethyl-2-hydroxynaphthalene-3-carboxylic acid amide and also
1- or 2-naphthylamine,
2-phenylaminonaphthalene,
1-dimethylaminonaphthalene or
2-ethylaminonaphthalene.

Examples of heterocyclic coupling components are indoles having acidic hydrogen atoms, for example:

2-methylindole, 2,5-dimethylindole,
2,4-dimethyl-7-methoxyindole,
2-phenyl- or 2-methyl-5-ethoxyindole,
N,β-cyanoethyl-2-methylindole,
2-methyl-5- or -6-chlorindole,
1,2-dimethylindole, 1-methyl-2-phenylindole,
2-methyl-5-nitroindole,
2-methyl-5-cyanoindole, 2-methyl-7-chloroindole,
2-methyl-5-fluoro- or -5-bromoindole,
2-methyl-5,7-dichloroindole or 2-phenylindole,
1-cyanoethyl-2,6-dimethylindole;
pyridines, for example,
3-cyano-2,6-dihydroxy-4-methylpyridine;
pyrazoles, for example,
1-phenyl-5-aminopyrazole or 3-methylpyrazolone-5-,
1-phenyl-3-methylpyrazoline-5, 1,3-dimethylpyrazoline-5,
1-butyl-3-methylpyrazolone-5,
1-hydroxyethyl-3-methylpyrazolone-5,
1-cyanoethyl-3-methylpyrazolone-5,
1-(ortho-chlorophenyl)-3-methylpyrazolone-5,
3-carbomethoxypyrazolone-5,
qulinolines, for example,
8-hydroxyquinoline,
1-methyl-4-hydroxyquinoline-2,
N-ethyl-3-hydroxy-7-methyl-1,2,3,4-tetrahydroquinoline;

pyrimidines, for example, barbituric acid; and also 1,3-indandione, 1,8-naphthindandione, dimedone, acetoacetic acid anilide, meta-hydroxy-N,N-diethylaniline, 3-hydroxy-4'-methyldiphenylamine, hydroquinone-monomethylether, acetylacetone, 5-hydroxybenzthiazole and 1,2-diphenylpyrazolidine-3,5-dione and finally, coupling components of the aniline series, for example, 1,2,3,4-tetrahydroquinolines (known as tetrahydroquinolines) and benzomorpholines, for example, tetrahydroquinoline, N-β-cyanoethyl- or N-β-hydroxyethyltetrahydroquinoline, N-β,γ-dihydroxypropyltetrahydroquinoline, N-β,γ - dihydroxypropyl - 7-methoxytetrahydroquinoline, N-β,γ - dihydroxypropyl - 5-acetylaminotetrahydroquinoline, N-β-hydroxyethyl -2,2,4-trimethyltetrahydroquinoline, N-β-hydroxyethylbenzomorpholine and N-β,γ-dihydroxypropyl-5-acetylaminobenzomorpholine.

Further coupling components of the aniline series that may be mentioned are those containing a quaternatable or quaternated group, for example, N-methyl-N,2-dimethylaminoethylaniline, N,2-(N'-ethyl-N'-phenyl) - aminoethylpyridinium chloride and also, for example, compounds of the formulae

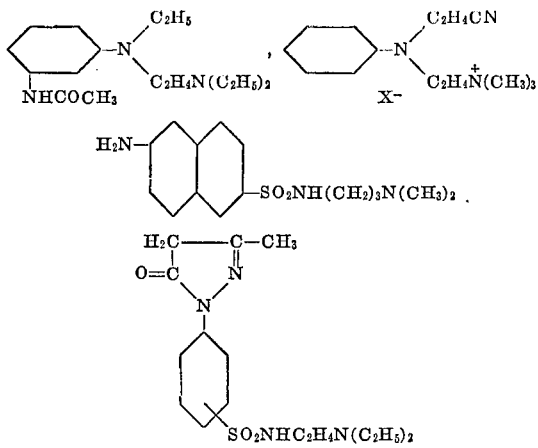

Diazotizable amines can also be mentioned as coupling components of the aniline series, for example, 1-amino-3-methylbenzene, 1-amino-2-methoxy - 5 - methylbenzene, 1-amino-naphthalene, and so forth; when used, aminoazo dyestuffs are formed that can be diazotized and then coupled with the coupling components specified above to form diazo or polyazo dyestuffs.

Finally, there may also be mentioned coupling components having acid hydrogen atoms, for example malodinitrile, phenylsulphonylacetonitrile, cyanoacetic acid methyl ester, cyanoacetic acid ethyl ester, cyanoacetic acid butyl ester, 4,5-dimethyl- and 4,5-diphenyl-imidazole.

The term "coupling" as used herein also includes the so-called oxidative coupling in which the diazonium compound of the diazo component is replaced by a corresponding hydrazine or hydrazone. By the process of oxidative coupling the quaternated compounds can also be obtained in one step, in this case, the benzthiazolium compounds.

The following scheme illustrates how coupling and simultaneous quaternation to form a monoazo dyestuff takes place:

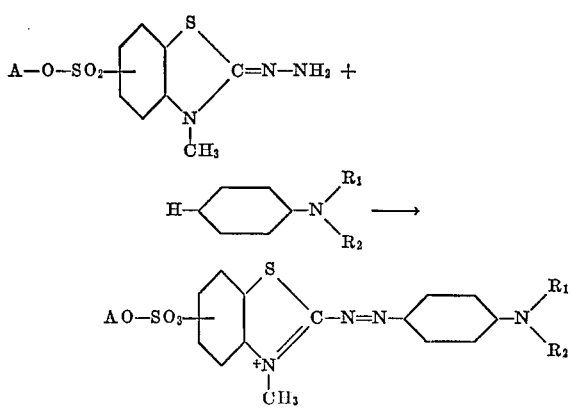

Suitable dehydrogenating or oxiding agents are, for example, atmospheric oxygen, hydrogen peroxide, hypochlorites, persulphates, perborates, iron(III) salts, copper (III) salts, mercury(II) salts, lead(IV) salts and cerium (IV) salts and hexacyanoferrates(III); if necessary, oxygen carriers may also be used concomitantly, for example, heavy metals and the salts thereof.

The hydrazones can be prepared according to known methods [R. Reimschneider and S. Georgi, Monatshefte für Chemie, vol. 91, 623 (1960); S. Hünig et al., Angewandte Chemie, vol. 70, 215 (1958); vol. 74, 818 (1962); vol. 80, 343 (1968); Chimia, vol. 15, 133 (1961); H. Baumann and H. Dehnert, Chimia, vol. 15, 163 (1961)].

Diazotization of the diazo components specified can be carried out, for example, with a mineral acid and sodium nitrite or, for example, with a solution of nitrosylsulphuric acid in concentrated sulphuric acid, according to the position of the amino group concerned.

Coupling can also be carried out by known methods, for example, in a neutral to acid medium, if necessary, in the presence of sodium acetate or a similar buffer that influences the rate of coupling, or a catalyst, for example, dimethylformamide, pyridine or a salt thereof.

Coupling may also be effected with advantage by combining the components in a mixing nozzle. By this is meant a device in which the liquids to be mixed are combined in a comparatively small space, at least one of the liquids being conducted through a nozzle, preferably under pressure. The mixing nozzle can be constructed on the principle of a water-jet pump, and function in like manner, the delivery of one of the liquids in the mixing nozzle corresponding to the delivery of water in a water-jet pump, and the delivery of the other liquid into the mixing nozzle corresponding to the compound in the container of the water-jet pump to be evacuated. The latter delivery of liquid can also be effected under pressure.

However, other devices can also be used to effect speedy and optionally, continuous mixing in a small space.

The dyestuffs can be quaternated by virtue of the nitrogen atom in the benzthiazole ring and when the residue A or one of the residues $R_1$ or $R_2$ contains a quarternatable nitrogen atom, for example, the above mentioned heterocyclic amines of the formula $D—NH_2$, quaternation preferably being carried out as the last step.

Quaternation can be effected by a treatment with esters of strong mineral acids or organic sulphonic acids, for example, dimethyl sulphate and diethyl sulphate, alkyl halides, for example methyl chloride, methyl bromide or methyl iodide, aralkyl halides, for example benzyl chloride, esters of low molecular weight alkane-sulphonic acids, for example, the methyl ester of methane-, ethane- or butane-sulphonic acid and the alkyl esters of (4-methyl-, 4-chloro- or 3- or 4-nitro)-benzene sulphonic acid which form as anions halogen, sulphuric acid semi-ester, alkane or benzene sulphonic acid anions, preferably by heating in an inert organic solvent, for example, xylene, carbon tetrachloride, ortho-dichlorobenzene or nitrobenzene. However, other solvents may also be used, for example acetic anhydride, dimethylformamide, acetonitrile or dimethyl sulphoxide. The quaternated dyestuffs preferably contain as anion $Y^-$ the residue of a strong acid, for example, the residue of sulphuric acid or semi-esters thereof, or a halide ion; however, they can also be used as double salts, for example, with zinc chloride, or as free bases.

The new water-insoluble dyestuffs, mixtures thereof and mixtures of these dyestuffs with other azo dyestuffs are eminently suitable for dyeing and printing leather, wool, silk and in particular, synthetic fibres, for example acrylic and acrylonitrile fibres, polyacrylonitrile fibres and copolymers of acrylonitrile and other vinyl compounds, for example acrylic esters, acrylic amides, vinylpyridine, vinyl chloride or vinylidene chloride, copolymers of dicyanoethylene and vinyl acetate and of acrylonitrile block copolymers, fibers made of polyurethane, basified polyolefines, for example polypropylene, cellulose triacetate and secondary acetate fibres and especially fibres made from polyamides, for example nylon 6, nylon 6.6 or nylon 12, and also fibres made from aromatic polyesters, for example, fibres made from terephthalic acid and ethylene glycol or 1,4 - dimethylcyclohexane, and copolymers of terephthalic and isophthalic acid and ethylene glycol.

This invention therefore also provides a process for dyeing or printing textile materials based on synthetic fibres, especially polyester fibres, or when the dyestuffs are quaternated, acrylic fibres, wherein there are used dyestuffs of the formula

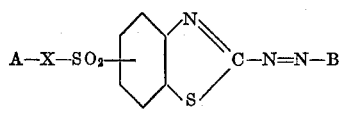

in which A reperesents an aryl residue that may be substituted, X represents a sulphur atom or preferably an oxygen atom and B represents the residue of a coupling component that is free from acidic groups imparting solubility in water.

When dyeing is carried out in an aqueous liquor, the water-insoluble dyestuffs are advantageously used in a finely divided form and dyeing is carried out in the presence of a dispersing agent, for example sulphite cellulose waste liquor, or a synthetic detergent, or a combination of different wetting and dispersing agents. Prior to dyeing, it is generally advantageous to convert the dyestuff into a dyeing preparation that contains a dispersing agent and the finely divided dyestuff in a form such that a fine dispersion is formed when the preparation is diluted with water. Such dyestuff preparations may be obtained in known manner, for example, by grinding the dyestuff in a grinding device in the dry or wet state in the presence or absence of a dispersing agent.

To obtain stronger dyeings on polyethylene terephthalate fibres it is advantageous to add a swelling agent to the dyebath, or to carry out the dyeing process under superatmospheric pressure at a temperature of above 100° C., for example at 120° C. Suitable swelling agents are aromatic carboxylic acids, for example salicylic acids, phenols, for example ortho- or para-hydroxydiphenyl, aromatic halogenated compounds, for example ortho-dichlorobenzene or diphenyl.

To fix the dyestuff, the padded polyester fabric is heated to a temperature above 100° C., for example to a temperature between 180 and 210° C., preferably after drying, for example in a current of warm air.

The dyeings obtained in accordance with this process can be subjected to an after-treatment, for example by heating with an aqueous solution of a non-ionic detergent.

The dyestuffs may also be applied by printing processes. In this method of application a printing paste, for example, in used which contains the finely divided dyestuff as well as the adjuvants normally used in printing, for example, wetting and thickening agents.

The process yields strong dyeings and prints possessing good properties of fastness.

The dyestuffs of the invention are also specially suitable for dyeing and printing polypropylene fibres modified with nickel, the dyestuffs used preferably being those that contain in ortho-position to the azo group, groups of atoms capable of forming complexes, for example hydroxy, carboxyl, carbalkoxy and alkoxy groups.

Dyestuffs that are specially suitable for dyeing polypropylene modified with nickel are those of the formula

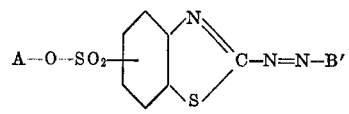

in which A has the meaning given above and B' represents a coupling component containing in ortho-position to the azo group a group capable of forming a complex.

The new water-insoluble dyestuffs can also be used in the spin-colouration of polyamides, polyesters and polyolefins. The polymer to be coloured in advantageously mixed with the dyestuff in the form of a powder, grains or chips, in the form of a solution ready for spinning or in the form of a melt, the dyestuff being in the dry state or in the form of a dispersion or solution in a solvent that may be volatile. After the dyestuff has been homogeneously dispersed in the polymer solution or melt, the mixture is processed in known manner into fibres, yarns, monofilaments, films and so forth by casting, molding or extruding.

The new water-soluble quaternated dyestuffs or dyestuff salts are suitable for dyeing and printing a very wide variety of synthetic fibres, for example polyvinyl chloride, polyamide, polyurethane and especially polyacrylic fibres.

The following examples illustrate the invention, the parts and percentages being by weight, unless otherwise stated.

EXAMPLE 1

6.1 parts of 2-aminobenzthiazolyl - 6 - sulphonic acid phenyl ester are stirred overnight with 50 parts of 85% phosphoric acid. The next day, the batch is cooled to —14° C. and 1.5 parts of pulverized sodium nitrite are added. A yellow suspension is obtained which is added, while cooling and stirring, to a solution of 4.86 parts of N - cyanoethyl - N - cyanoethoxyethylaniline in 250 parts of ethyl alcohol. The batch is stirred for 3 hours, diluted with 150 parts of ice, filtered, and the filter residue is washed successively with 80% alcohol, 50% alcohol and water until free from acid. The dyestuff of the formula

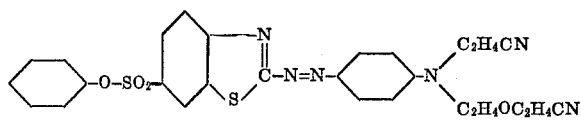

is obtained in a good yield. It dyes secondary acetate, triacetate and polyester fibres a red shade possessing excellent properties of fastness.

The dyestuffs of the formula

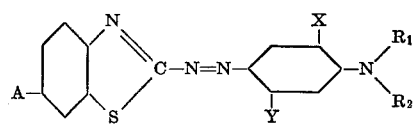

listed in the following table may be obtained by diazotization and coupling in accordance with this example. The dyestuffs obtained dye secondary acetate, triacetate, polyamide and polyester fibres the shades indicated in the last column.

| No. | A | X | Y | $R_1$ | $R_2$ | Shade |
|---|---|---|---|---|---|---|
| 1 | ⌬—O—SO$_2$— | —OCH$_3$ | —CF$_3$ | —C$_2$H$_4$OCOCH$_3$ | —C$_2$H$_4$OCOCH$_3$ | Red. |
| 2 | Same as above | —H | —Br | —C$_2$H$_4$CN | —C$_2$H$_4$OCH$_3$ | Red. |
| 3 | do | —H | —Cl | —C$_2$H$_4$CN | —C$_2$H$_4$OC$_2$H$_4$CN | Red. |
| 4 | do | —H | —NHCOCH=CH—⌬ | —H | —C$_2$H$_4$CN | Red. |
| 5 | CH$_3$—⌬—O—SO$_2$— | —OCH$_3$ | —NHCOCH$_2$CH$_3$ | —CH$_3$ | —CH$_3$ | Violet. |
| 6 | Same as above | —OCH$_3$ | ⌬H | —C$_2$H$_4$OCOC$_3$H$_7$ | —C$_2$H$_4$OCOC$_3$H$_7$ | Red B. |
| 7 | do | —H | —CH$_2$—⌬ | —C$_2$H$_4$OCH$_3$ | —C$_2$H$_4$OCH$_3$ | Red. |
| 8 | do | —OC$_2$H$_5$ | —NHCOCH$_3$ | —H | —C$_2$H$_4$OCOOC$_2$H$_5$ | Violet. |
| 9 | C$_2$H$_5$—⌬—O—SO$_2$— | —OCH$_3$ | —⌬ | —H | —H | Red B. |
| 10 | Same as above | ⌬—O— | —H | —H | —C$_2$H$_4$CN | Do. |
| 11 | do | —OCH$_3$ | —S—⌬ | —C$_2$H$_4$OCOCH$_3$ | —C$_2$H$_4$OCOCH$_3$ | Do. |
| 12 | (CH$_3$)$_2$CH—⌬—O—SO$_2$— | —H | ⌬—O—⌬(Cl) | —H | —C$_2$H$_4$CN | Do. |
| 13 | Same as above | —OCH$_3$ | x—O—⌬ | —H | —C$_2$H$_4$CN | Do. |
| 14 | do | —H | —NHCOCH$_3$ | —C$_2$H$_4$CN | —C$_2$H$_4$CN | Red. |
| 15 | ⌬—⌬—O—SO$_2$— | —H | —NHCO—NH—⌬ | —H | —H | Red B. |
| 16 | Same as above | —H | —NHSO$_2$—⌬ | —H | —H | Do. |

TABLE—Continued

| No. | A | X | Y | R₁ | R₂ | Shade |
|---|---|---|---|---|---|---|
| 17 | See Example 15 | —CH₃ | —NHCOOC₂H₅ | —H | —C₂H₄OH | Red B. |
| 18 | CH₃—O—⬡—O—SO₂— | —OCH₃ | —NHCOCH₂CH₃ | —C₂H₄OCOCH₃ | —C₂H₄OCOCH₃ | Violet. |
| 19 | Same as above | —H | —H | —C₂H₄CN | —C₂H₄CN | Red. |
| 20 | do | —H | —H | —C₂H₄OC₂H₄CN | —C₂H₄OCH₃ | Red B. |
| 21 | do | —H | —NHCOOCH₃ | —C₂H₄CN | —C₂H₄OCOCH₃ | Do. |
| 22 | Same as above | —O—CH₂—⬡ | —H | —H | —C₂H₄CN | Red. |
| 23 | CH₃CONH—⬡—O—SO₂— | —H | —N(C₂H₅)(COCH₂—CH(CH₃)₂) | —CH₃ | —CH₃ | Red B. |
| 24 | Same as above | —OCH₃ | —CH₃ | —CH₃ | —C₂H₄OC₂H₄CN | Do. |
| 25 | ⬡(N(CH₃)₂)—O—SO₂— | —H | —NHCOCH₃ | —C₄H₉ | —C₂H₄OCH₃ | Do. |
| 26 | Same as above | —H | —H | —C₂H₄CN | —CH₂—⬡ | Red. |
| 27 | do | —H | —H | —C₂H₄CN | —CH₂—CH₂—⬡ | Red. |
| 28 | NH₂—CO—NH—⬡—O—SO₂— | —H | —H | —C₂H₄OCH₃ | —CH₂—⬡—NO₂ | Red. |
| 29 | Same as above | —H | —H | —C₂H₄CN | —C₂H₄—O—CH₂—⬡ | Red. |
| 30 | do | —H | —H | —C₂H₄COCH₂ | —CH₃ | Red. |
| 31 | (CH₃)₃—C—⬡—O—SO₂— | —H | —H | —C₂H₄NHCO—⬡ | —C₂H₄CN | Red. |
| 32 | Same as above | —H | —H | —C₂H₄Cl | —C₂H₄Cl | Red. |
| 33 | ⬡—N=N—⬡—O—SO₂— | —H | —CH₃ | —C₂H₅ | —C₂H₄COOCH₃ | Red. |
| 34 | ⬡—O—SO₂— | —H | —CH₃ | —C₂H₅ | —C₂H₄COOH | Red. |

EXAMPLE 2

6.4 parts of 2-aminobenzthiazolyl-6-sulphonic acid-(3'-methylphenyl ester) are stirred overnight with 50 parts of 85% phosphoric acid. The next day, the batch is cooled to −14° C. and 1.5 parts of pulverized sodium nitrite are added. A yellow suspension is obtained which is added, while cooling and stirring, to a solution of 2.62 parts of 2-methylindole in 150 parts of methanol. The batch is stirred for 3 hours, diluted with 100 parts of ice, filtered, and the filter residue is washed successively with 80% methanol and 50% methanol and then with water until free from acid. The dyestuff of the formula

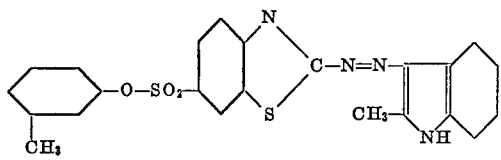

is obtained in a good yield. It dyes secondary acetate, triacetate and polyester fibres a yellow shade possessing excellent properties of fastness.

The amines listed in column I of the following table may be diazotized in the manner described in this example and coupled with the coupling components listed in column II. The shades that the dyestuffs so obtained produce on secondary acetate, triacetate and polyester fibres are indicated in column III.

of 85% phosphoric acid. The next day, the batch is cooled to −14° C. and 1.5 parts of pulverized sodium nitrite are added. A yellow suspension is obtained which is added, while cooling and stirring, to a solution of 9.8 parts of 3 - dibromopropionylamino-N,N-diacetoxyethyl-aminobenzene in 250 parts of methanol. The batch is stirred for 3 hours, diluted with 150 parts of ice, filtered, and the filter residue is washed successively with 80% methanol and 50% methanol and then with water until free from acid. The dyestuff of the formula

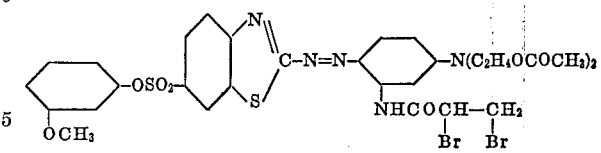

is obtained in a good yield. It dyes secondary acetate, triacetate, polyamide and polyester fibres a violet shade possessing excellent properties of fastness.

The dyestuffs of the formula

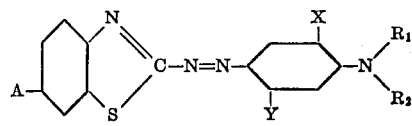

listed in the following table may be obtained by diazotization and coupling in accordance with this example. The

| No. | I | II | III |
|---|---|---|---|
| 1 | 2-amino-6-phenyloxysulphonyl-benzthiazole | 2-methyl-5-chloroindole | Yellow. |
| 2 | do | 2-methyl-7-chloroindole | Do. |
| 3 | do | 2-methyl-5-bromoindole | Do. |
| 4 | do | 2,5-dimethylindole | Do. |
| 5 | 2-amino-6-(3'-methoxyphenyl-oxysulphonyl)-benzthiazole | N-β-cyanoethyl-1,2,3-tetrahydroindole | Do. |
| 6 | do | 2,5-dimethylindole | Do. |
| 7 | do | 1-methyl-2-phenylindole | Do. |
| 8 | do | 1,2-dimethylindole | Do. |
| 9 | 2-amino-6-(4'-phenylphenyl-oxysulphonyl)-benzthiazole | 2-phenylindole | Do. |
| 10 | do | 1-phenyl-3-methyl-5-aminopyrazole | Do. |
| 11 | do | 1-phenyl-3-methyl-5-pyrazolone | Do. |

EXAMPLE 3

6.7 parts of 2-aminobenzthiazolyl-6-sulphonic acid-(3'-methoxyphenyl ester) are stirred overnight with 50 parts dyestuffs obtained dye secondary acetate, triacetate, polyamide and polyester fibres the shades indicated in the last column.

| No. | A | X | Y | R₁ | R₂ | Shade |
|---|---|---|---|---|---|---|
| 1 | ⌬—O—SO₂— | —H | —H | —C₂H₅ | C₂H₄—N(CH₃)(COCH₂Cl) | Red. |
| 2 | Same as above | —H | —H | —C₂H₅ | —C₂H₄—N(CH₃)—C(=N—C(F)=N—C=N) with F | Red₂ |
| 3 | CH₃—⌬(CH₃)—O—SO₂— | —H | Cl, —NH—C(N=C—N=C—OC₂H₄OC₂H₅) | —C₂H₄OCH₃ | —C₂H₄OCH₃ | Red B₂ |
| 4 | Same as above | —H | —NH—CO—CH=CH—CH—CH₂, CF₂—CF₂ | —C₂H₄OCOCH₃ | —C₂H₄OCOCH₃ | Do₂ |
| 5 | CH₃CONH—⌬—O—SO₂— | —H | Cl, —NH—C(N=C—N=C—OCH₃) | —C₂H₄CN | —C₂H₄CN | Red₃ |
| 6 | Same as above | —H | —NHCOCH₂Cl | —C₂H₄OCOCH₃ | —C₂H₄OCOCH₃ | Red B₂ |

Example of dyeing procedure 10 parts of a knitted fabric made from nylon 6.6 ("Helanca") are entered at 30° C. into a dyebath consisting of 0.2 part of 80% acetic acid and 2 parts of a 5% aqueous dispersion of the compound obtained in accordance with Example 3 in 400 parts by volume of water, the pH of the bath being 4 to 5. The dyebath is brought to the boil within 45 minutes and dyeing is carried out at the boil for 30 minutes. The pH is then adjusted to 12 by the addition of sodium carbonate and boiling is continued for a further 30 minutes. The textile material is then well rinsed with water and dried. A brilliant violet dyeing possessing a high proportioning of non-extractable dyestuff is obtained.

The dyestuff dispersion used may be obtained by grinding 20 parts of dyestuff together with 140 parts of water and 40 parts of sodium dinaphthylmethane disulphonate.

EXAMPLE 4

6.1 parts of 2-aminobenzthiazolyl-6-sulphonic acid phenyl ester are stirred overnight with 50 parts of 85% phosphoric acid. The next day, the batch is cooled to —14° C. and 1.5 parts of pulverized sodium nitrite are added. A yellow suspension is obtained which, while cooling and stirring, is run into a solution of 2.88 parts of β-naphthol in 75 parts of ethyl alcohol with simultaneous addition of an NaOH solution. The batch is stirred for 3 hours, 150 parts of ice are added, the batch is filtered and the filtered residue is washed successively with 80% alcohol and 50% alcohol and then with water until free from acid. The dyestuff of the formula

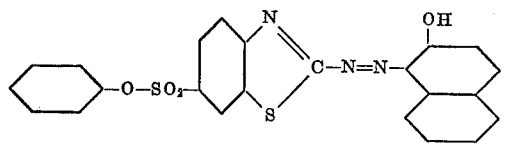

is obtained in a good yield. It yields bluish green dyeings and prints possessing excellent properties of fastness on nickel-modified polypropylene. It dyes polyester fibres an orange shade possessing excellent properties of fastness.

Printing procedure 1 part of the dyestuff obtained in accordance with Example 4 is ground in a ball mill together with 1 part of 1,1'-dinaphthylmethane-2,2'-disulphonic acid to form a fine aqueous paste having a dyestuff content of 10%.

A mixture comprising the following components is then prepared by means of a high-speed stirrer:

- 100 parts of the above paste
- 310 parts of cold water
- 50 parts of urea
- 500 parts of a 5% aqueous sodium alginate solution
- 40 parts of ammonium sulphate 1000 parts A polypropylene fabric containing nickel is printed with the printing paste so obtained. After printing, the fabric is dried, steamed for 30 minutes, rinsed in cold water, soaped for 20 minutes at 60° C. in a solution containing 1 to 2 grams of the condensation product of 9 mols of ethylene oxide and 1 mol of nonylphenol per litre of water, and then rinsed with cold water. A bluish green print possessing very good properties of fastness is obtained.

EXAMPLE 5

6.1 parts of 2-aminobenzthiazolyl-6-sulphonic acid phenyl ester are stirred overnight with 50 parts of 85% phosphoric acid. The next day, the batch is cooled to —14° C. and 1.5 parts of pulverized sodium nitrite are added. A yellow suspension is obtained which is added, while cooling and stirring, to a solution of 7.2 parts of N-dimethyl-N-hexyl-N - β - (ethylphenylamino)-ethyl-amino-ammonium bromide in 150 parts of 80% methanol. The batch is stirred for 3 hours, diluted with 150 parts of ice, the dyestuff is salted out with sodium chloride and isolated by vacuum filtration. The dystuff of the formula

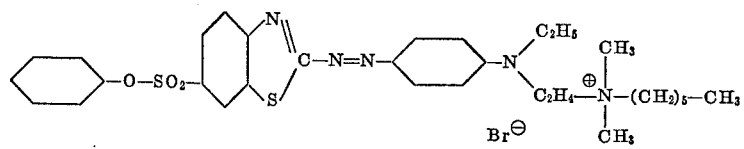

is obtained in a good yield. It dyes polyacrylonitrile fibres a red shade possessing excellent properties of fastness.

The dyestuffs of the formula

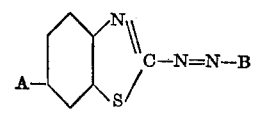

given in the following table may be obtained by diazotization and coupling in accordance with this example. The shades they produce on polyacrylonitrile fibres are indicated in the last column.

| No. | A | B | Shade |
|---|---|---|---|
| 1 | | [phenyl-N(C2H4OCH3)(C2H4-N-pyridinium)]⊕ C7H7SO3⊖ | Red |
| 2 | | [phenyl(OCH3)(NHCOCH3)-NHCH2CH2-N-pyridinium]⊕ Cl⊖ | Violet |

TABLE—Continued

| No. | A | B | Shade |
|---|---|---|---|
| 3 | 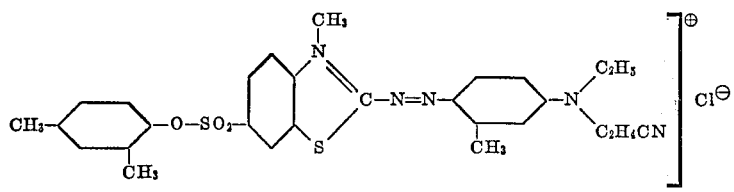 (CH₃SO₄⁻ counterion; naphthyl bearing ⁺N(CH₃)₃-CH₂ and —O—SO₂—) | [phenyl—N(C₂H₄OCO—pyridinium-CH₃)(C₂H₄CN)] CH₃SO₄⁻ | Red. |
| 4 | (CH₃)₂CH—C₆H₄—O—SO₂— | [NH₂-naphthyl—SO₂NH—(CH₂)₃—⁺N(CH₃)₃] CH₃SO₄⁻ | Red. |
| 5 | CH₃—C₆H₄—O—SO₂— | [HO—pyrazole(CH₃)—N—phenyl—NHCO(CH₂)₂N(CH₃)₃]⁺ Cl⁻ | Yellow. |

EXAMPLE 6

6.7 parts of 2-aminobenzthiazolyl-6-sulphonic acid-(2′,4′-dimethylphenyl ester) are stirred overnight with 50 parts of 85% phosphoric acid. The next day, the batch is cooled to —14° C. and 1.5 parts of pulverized sodium nitrite are added. A yellow suspension is obtained which is added, while cooling and stirring, to a solution of 3.76 parts of N-cyanoethyl-N-ethyl-meta-toluidine in 250 parts of methanol. The batch is stirred for 3 hours, filtered the filter residue is washed successively with 80% alcohol and 50% alcohol and then with water until face from acid, and then dried.

5.5 parts of the dyestuff so obtained are dissolved in 50 parts of dimethylformamide; 2.5 parts of dimethyl sulphate are added and the batch is stirred for 1 hour at 130° C. The solvent is then evaporated, the residue is dissolved in hot water, and the dystuff of the formula

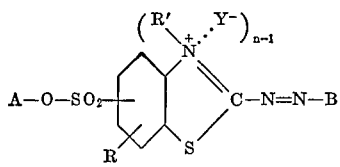

is salted out with sodium chloride and isolated by filtration. It dyes polyacrylonitrile fibres a bluish red shade possessing excellent properties of fastness.

I claim:

1. An azo dyestuff free from acidic groups imparting solubility in water of the formula

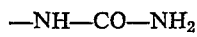

in which A represents phenyl or phenyl substituted by $C_1$-$C_8$-alkyl, $C_1$-$C_4$-alkoxy, cyclohexyl, phenyl, dimethylaminomethyl, di($C_1$-$C_2$-alkyl)amino, phenoxy, $C_1$-$C_4$-fatty acid acylamino, benzoylamino, $C_1$-$C_4$-alkoxycarbonylamino, $C_1$-$C_4$-alkylaminocarbonylamino and

—NH—CO—NH₂

R′ is $C_{1-4}$-alkyl or benzyl, R is hydrogen or methyl, n is 1 or 2, Y⁻ is an anion, and B is a coupling component selected from the group consisting of phenol, meta-cresol, para-cresol,
α-naphthol, β-naphthol,
4-methoxy-1-hydroxynaphthalene,
2-hydroxy-8-methylsulphonylaminonaphthalene,
2-hydroxynaphthalene-3-carboxylic acid anilide,
2-hydroxy-8-acetylaminonaphthalene,
1-hydroxynaphthalene-3-sulphonemethylene-ether-4,
2-hydroxynaphthalene-6-sulphonamide,
2-hydroxynaphthalene-6-sulphonic acid dimethylamide,
1-hydroxy-5,8-dichloronaphthalene,
N,β-dimethylaminoethyl-2-hydroxynaphthalene-3-carboxylic acid amide,
1- or 2-naphthylamine,
2-phenylaminonaphthalene,
1-dimethylaminonaphthalene,
2-ethylaminonaphthalene,
2-methylindole,
2,5-dimethylindole,
2,4-dimethyl-7-methoxyindole,
2-phenyl- or 2-methyl-5-ethoxyindole,
N,β-cyanoethyl-2-methylindole,
2-methyl-5- or -6-chloroindole,
1,2-dimethylindole,
1-methyl-2-phenylindole,
2-methyl-5-nitroindole,
2-methyl-5-cyanoindole,
2-methyl-7-chloroindole,
2-methyl-5-fluoro- or -5-bromoindole,
2-methyl-5,7-dichloroindole,
2-phenylindole,
1-cyanoethyl-2,6-dimethylindole,
3-cyano-2,6-dihydroxy-4-methylpyridine,
1-phenyl-5-aminopyrazole,
3-methylpyrazolone-5-,
1-phenyl-3-methylpyrazolone-5,
1,3-dimethylpyrazolone-5, 1-butyl-3-methylpyrazolone-5,
1-hydroxyethyl-3-methylpyrazolone-5,
1-cyanoethyl-3-methylpyrazolone-5,
1-(ortho-chlorophenyl)-3-methylpyrazolone-5,
3-carbomethoxypyrazolone-5,
8-hydroxyquinoline,
1-methyl-4-hydroxyquinolone-2,
N-ethyl-3-hydroxy-7-methyl-1,2,3,4-tetrahydroquinoline,
barbituric acid,
1,3-indandione,
1,8-naphthindandione,
dimedone,
acetoacetic acid anilide,
meta-hydroxy-N,N-diethylaniline,
3-hydroxy-4'-methyldiphenylamine,
hydroquinone-monomethylether,
acetyl acetone,
5-hydroxybenzthiazole,
1,2-diphenylpyrazolidine-3,5-dione,
2,3,4-tetrahydroquinoline,
N,β-cyanoethyl- or N-β-hydroxyethyltetrahydroquinoline,
N-β,γ-dihydroxypropyltetrahydroquinoline,
N-β,γ-dihydroxypropyl-7-methoxytetrahydroquinoline,
N-β,γ-dihydroxypropyl-5-acetylaminotetrahydroquinoline,
N-β-hydroxyethyl-2,2,4-trimethyltetrahydroquinoline,
N-β-hydroxyethylbenzomorpholine,
N-β,γ-dihydroxypropyl-5-acetylaminobenzomorpholine, and those of the formula

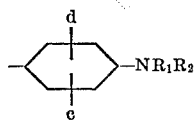

in which $d$ represents hydrogen, halogen, lower alkyl, lower alkoxy, lower alkylmercapto, phenyl, phenylmercapto, phenoxy, cyclohexyl, cyclohexylmethyl or benzyl, $c$ is the same as $d$ or $C_1$–$C_7$-acylamino, styryl carbonylamino β-chlorophenoxy, phenylureido, phenylsulfonylamino, N-ethyl-N-isopropylacetyl, α,β-dibromopropionylamino, trifluoromethyl, methanesulfonylamino, ethanesulfonylamino, methoxycarbonylamino,

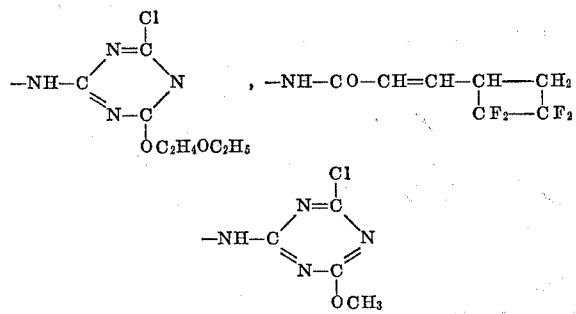

$R_1$ and $R_2$ each is hydrogen or lower alkyl optionally interrupted by oxygen, which may be substituted by chlorine, phenyl, cyano, $C_1$–$C_2$-alkyl, $C_1$–$C_4$-fatty acid acylamino, hydroxy, $C_1$–$C_4$-fatty acid acyloxy, benzoyl, methoxybenzoyl, phenoxybenzoyl, benzyloxy, nitrophenyl, nitrophenoxy, β-cyanoacetoxy, methoxy, carboxy, benzoylamino, difluorotriazinyl, pyridyl, $C_1$–$C_3$-alkyloxycarbonyl, methylcarbamyloxy, phenylcarbamyloxy, di-($C_1$–$C_2$-alkyl)amino, alkyl-ammonium, pyridinium and pyridinium carbonyloxy, $R_1$ can be also phenyl or 4-ethoxyphenyl, and $R_1$ and $R_2$ together may be

—CH$_2$CH$_2$—O—CH$_2$CH$_2$— and R' is $C_1$–$C_4$-alkyl or $C_7$-aralkyl.

2. An azo dyestuff as claimed in claim 1 wherein B is a coupling moiety of the formula

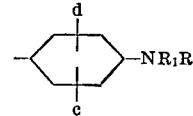

in which $d$ represents hydrogen, halogen, lower alkyl, lower alkoxy, lower alkylmercapto, phenyl, phenylmercapto, phenoxy, cyclohexyl, cyclohexylmethyl or benzyl, $c$ is the same as $d$ or $C_1$–$C_7$-acylamino, styryl carbonylamino, β-chlorophenoxy, phenylureido, phenylsulfonylamino, N-ethyl-N-isopropylacetyl, α,β-dibromopropionylamino, trifluoromethyl, methanesulfonylamino, ethanesulfonylamino, methoxycarbonylamino,

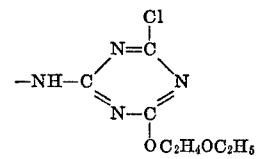

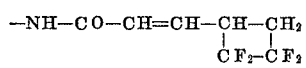

or

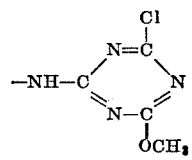

$R_1$ and $R_2$ each is hydrogen or lower alkyl optionally interrupted by oxygen, which may be substituted by chlorine, phenyl, cyano, $C_1$–$C_2$ alkyl, $C_1$–$C_4$ fatty acid acylamino, hydroxy, $C_1$–$C_4$ fatty acid acyloxy, benzoyl, methoxybenzoyl, phenoxybenzoyl, benzyloxy, nitrophenyl, nitrophenoxy, β-cyanoacetoxy, methoxy, carboxy, benzoylamino, difluorotriazinyl, pyridyl, $C_1$–$C_3$ alkyloxycarbonyl, methylcarbamyloxy, phenylcarbamyloxy, di($C_1$–$C_2$ alkyl)amino, alkylammonium, pyridinium, and pyridinium carbonyloxy, $R_1$ can be also phenyl or 4-ethoxyphenyl, and $R_1$ and $R_2$ together may be —CH$_2$CH$_2$—O—CH$_2$CH$_2$—, and R' is $C_1$–$C_4$ alkyl or $C_7$ aralkyl.

3. An azo dyestuff free from acidic groups imparting solubility in water of the formula

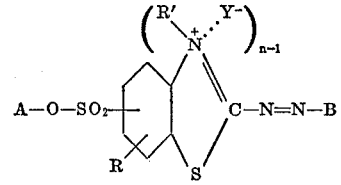

in which A represents phenyl or phenyl substituted by $C_1$–$C_8$ alkyl, $C_1$–$C_4$ alkoxy, $C_5$–$C_6$ cyclohexyl, phenyl, dimethylaminomethyl, di($C_1$–$C_2$ alkyl)amino, phenoxy, $C_1$–$C_4$ fatty acid acylamino, benzoylamino, $C_1$–$C_4$ alkoxycarbonylamino, $C_1$–$C_4$ alkylaminocarbonylamino and —NH—CO—NH$_2$, B is a coupling moiety of the formula

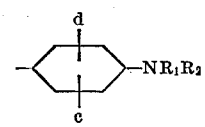

in which $d$ represents hydrogen, halogen, lower alkyl, lower alkoxy, lower alkylmercapto, phenyl, phenylmercapto, phenoxy, cyclohexyl, cyclohexylmethyl or benzyl, $c$ is the same as $d$ or $C_1$–$C_7$ acylamino, styryl carbonylamino, β-chlorophenoxy, phenylureido, phenylsulfonylamino, N-ethyl-N-isopropylacetyl, α,β-dibromopropionylamino trifluoromethyl, methanesulfonylamino, ethanesulfonylamino, methoxycarbonylamino,

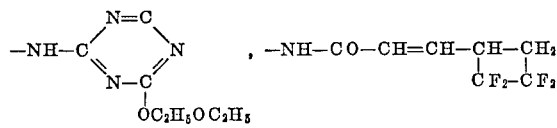

or

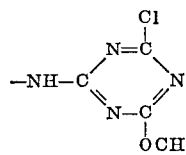

$R_1$ and $R_2$ each is hydrogen or lower alkyl optionally interrupted by oxygen, which may be substituted by chlorine, phenyl, cyano, $C_1$–$C_2$ alkyl, $C_1$–$C_4$ fatty acid acylamino, hydroxy, $C_1$–$C_4$ fatty acid acyloxy, benzoyl, methoxybenzoyl, phenoxybenzoyl, benzyloxy, nitrophenyl, nitrophenoxy, β-cyanoacetoxy, methoxy, carboxy, benzoylamino, difluorotriazinyl, pyridyl, $C_1$–$C_3$ alkyloxycarbonyl, methylcarbamyloxy, phenylcarbamyloxy, di($C_1$–$C_2$ alkyl) amino, alkylammonium, pyridinium, and pyridinium carbonyloxy, $R_1$ can be also phenyl or 4-ethoxyphenyl, and $R_1$ and $R_2$ together may be —$CH_2CH_2$—O—$CH_2CH_2$, $R'$ is $C_{1-4}$ alkyl or benzyl, R is hydrogen or methyl, $n$ is 1 or 2, and $Y^-$ is an anion.

4. A dyestuff as claimed in claim 3 of the formula

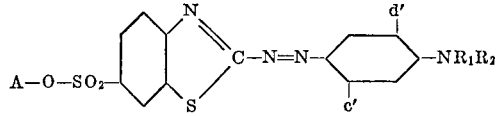

wherein each of the residues $c'$ and $d'$ represents hydrogen, methyl, ethyl, methoxy, ethoxy, phenyl, phenylthio or phenoxy and in which $c'$ can also represent $C_{1-7}$ acylamino.

5. A dyestuff of the formula

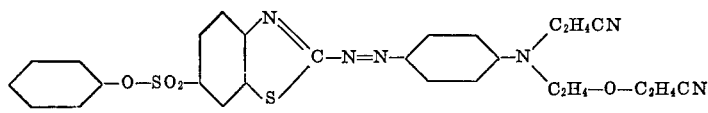

6. A dyestuff of the formula

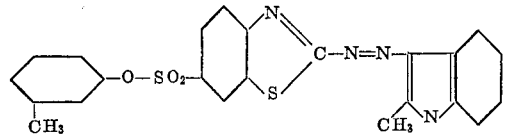

7. A dyestuff of the formula

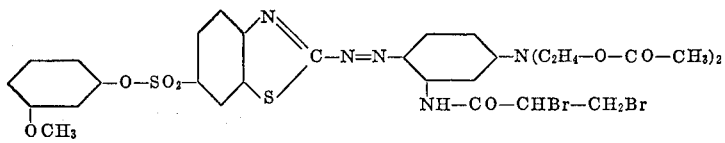

8. A dyestuff of the formula

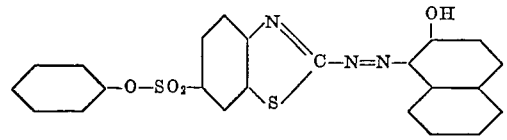

9. A dyestuff of the formula

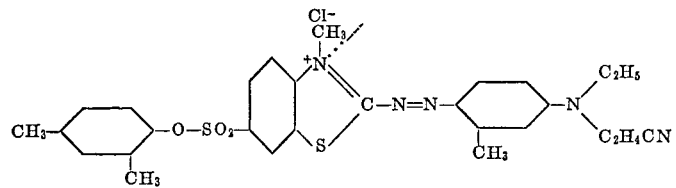

References Cited
UNITED STATES PATENTS
3,418,310   12/1968   Dale III et al. _____ 260—158

JOSEPH REBOLD, Primary Examiner

D. M. PAPUGA, Assistant Examiner

U.S. Cl. X.R.

8—26, 41 B, 41 D; 260—146 R, 153, 155, 239.9, 294.8 R, 294.9, 295 AM, 305, 310 A, 465 D, 556 AR

UNITED STATES PATENT OFFICE
CERTIFICATE OF CORRECTION

Patent No. 3,686,162      Dated August 22, 1972

Inventor(s) KLAUS ARTZ

It is certified that error appears in the above-identified patent and that said Letters Patent are hereby corrected as shown below:

Column 23, left-hand formula should read

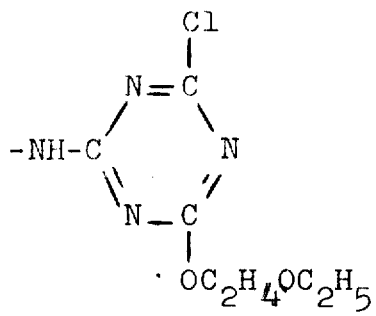

Column 23, bottom formula should read

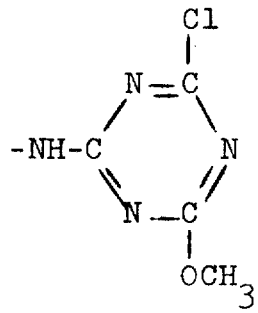

UNITED STATES PATENT OFFICE
CERTIFICATE OF CORRECTION

Patent No. 3,686,162　　　　　　　Dated August 22, 1972

Inventor(s) KLAUS ARTZ　　　　　　　PAGE 2

It is certified that error appears in the above-identified patent and that said Letters Patent are hereby corrected as shown below:

Column 24, claim 9 formula should read

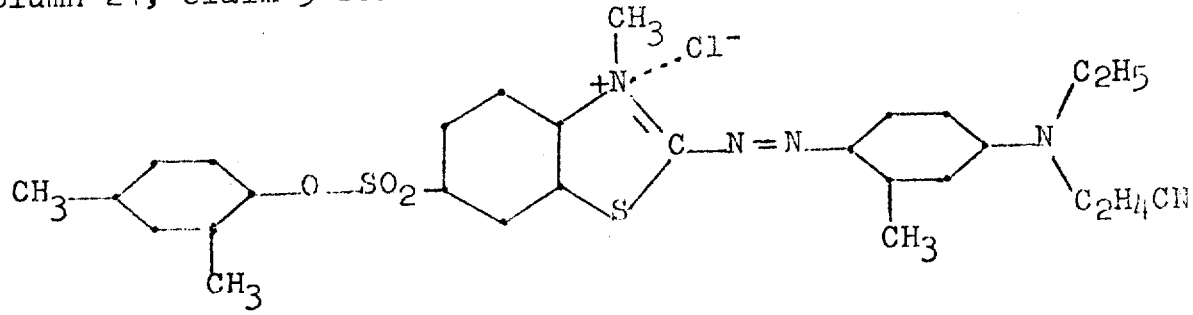

Signed and sealed this 6th day of August 1974.

(SEAL)
Attest:

McCOY M. GIBSON, JR.　　　　　　　C. MARSHALL DANN
Attesting Officer　　　　　　　　Commissioner of Patents